(12) United States Patent
Deligianni et al.

(10) Patent No.: US 7,736,753 B2
(45) Date of Patent: Jun. 15, 2010

(54) FORMATION OF NANOSTRUCTURES COMPRISING COMPOSITIONALLY MODULATED FERROMAGNETIC LAYERS BY PULSED ECD

(75) Inventors: Hariklia Deligianni, Tenafly, NJ (US); Qiang Huang, Ossining, NY (US); Lubomyr T. Romankiw, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 11/620,480

(22) Filed: Jan. 5, 2007

(65) Prior Publication Data

US 2008/0166584 A1 Jul. 10, 2008

(51) Int. Cl.
*B32B 5/16* (2006.01)
(52) U.S. Cl. .................. 428/678; 428/402; 428/548; 428/615; 428/680; 428/681; 428/686; 977/762; 977/810; 977/838
(58) Field of Classification Search .......... 428/402, 428/548, 615, 686, 678, 680, 681; 977/762, 977/810, 838
See application file for complete search history.

(56) References Cited

U.S. PATENT DOCUMENTS

| | | | |
|---|---|---|---|
| 6,177,204 B1 * | 1/2001 | Chen et al. .................. | 428/611 |
| 6,741,019 B1 * | 5/2004 | Filas et al. .................. | 313/355 |
| 2002/0031008 A1 | 3/2002 | Den et al. | |
| 2005/0168879 A1 * | 8/2005 | Dieny et al. .................. | 360/324 |
| 2005/0186686 A1 | 8/2005 | Chen et al. | |
| 2008/0165576 A1 * | 7/2008 | Deligianni et al. .......... | 365/171 |

OTHER PUBLICATIONS

Parkin, S. S. P. et al., Oscillations in Exchange Coupling and Magnetoresistance in Metallic Superlattice Structures: Co/Ru, Co/Cr, and Fe/Cr, The American Physical Society, 1990, pp. 2304-2308, vol. 64, No. 19.

Parkin S. S. P., Oscillations in Giant Magnetoresistance and Antiferromagnetic Coupling in [Ni81Fe19/Cu]N Multilaters, Appl. Phys. Lett., Jan. 27, 1992, pp. 512-514, vol. 60, No. 4.

Jimbo, Mutsuko, Giant Magnetoresistance in FeNiCO / Cu Multilayers, Jpn. J. Appl. Phys., Sep. 15, 1992, pp. L 1348-L 1350, vol. 31, Part 2, No. 9B.

Alper, M. et al., Giant Magnetoresistance in Electrodeposited Superlattices, Appl. Phys. Lett, Oct. 11, 1993, pp. 2144-2146, vol. 63, No. 15.

(Continued)

*Primary Examiner*—H. (Holly) T Le
(74) *Attorney, Agent, or Firm*—Scully, Scott, Murphy & Presser, P.C.; Vazken Alexanian (57) ABSTRACT

The present invention is related to a method for forming a structure that contains alternating first and second ferromagnetic layers of different material compositions. A substrate containing a supporting matrix with at least one open pore and a conductive base layer is first formed. Electroplating of the substrate is then carried out in an electroplating solution that contains at least one ferromagnetic metal element and one or more additional, different metal elements. A pulsed current with alternating high and low potentials is applied to the conductive base layer of the substrate structure to thereby form alternating ferromagnetic layers of different material compositions in the open pore of the supporting matrix.

8 Claims, 8 Drawing Sheets

OTHER PUBLICATIONS

Ross, C. A., Electrodeposited Multilayer Thin Films, Annu. Rev. Mater. Sci., 1994, pp. 159-188, vol. 24, downloaded from arjournals.annualreviews.org.

Martin, Charles R., Nanomaterials: A Membrane-Based Synthetic Approach, Science, New Series, Dec. 23, 1994, pp. 1961-1966, vol. 266, No. 5193, downloaded from www.jstor.org.

* cited by examiner

FORMATION OF NANOSTRUCTURES COMPRISING COMPOSITIONALLY MODULATED FERROMAGNETIC LAYERS BY PULSED ECD

CROSS-REFERENCE TO RELATED APPLICATION

The present application is related to U.S. patent application Ser. No. 11/620,445 entitled "MEMORY STORAGE DEVICES COMPRISING DIFFERENT FERROMAGNETIC MATERIAL LAYERS, AND METHODS OF MAKING AND USING THE SAME", now U.S. Patent Application Publication No. 2008/0165576, and U.S. patent application Ser. No. 11/620,497 entitled "FORMATION OF VERTICAL DEVICES BY ELECTROPLATING", now U.S. Patent Application Publication No. 2008/0166874, which were filed on even date herewith and are assigned to the same assignee as the present application. The entire contents of such U.S. patent applications are incorporated herewith by reference for all purposes.

FIELD OF THE INVENTION

The present invention relates to nanostructures comprising compositionally modulated ferromagnetic layers, and a method of forming such nanostructures using pulsed electrochemical deposition (ECD) or electroplating techniques.

BACKGROUND OF THE INVENTION

Figure 1A:
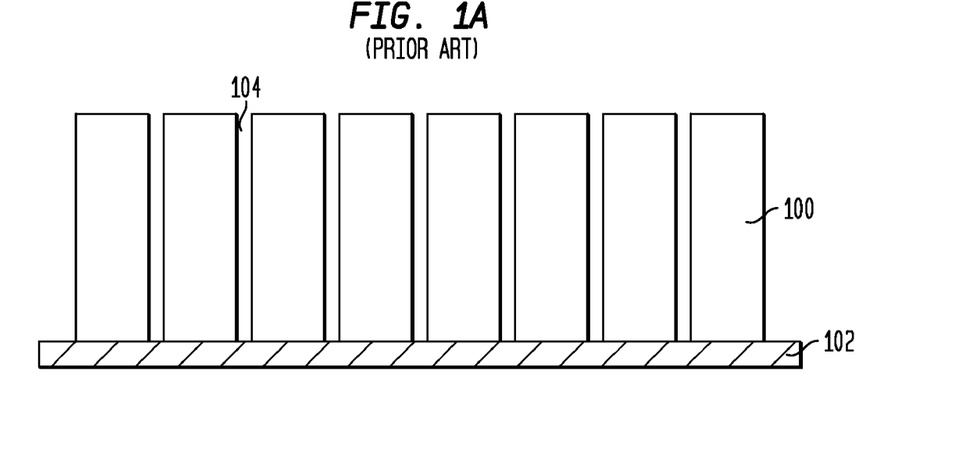
FIGS. 1A-1C are cross-sectional views that illustrate the processing steps of a conventional bottom-up ECD or electroplating through mask process for forming metal nanowires.
Figure 1B:
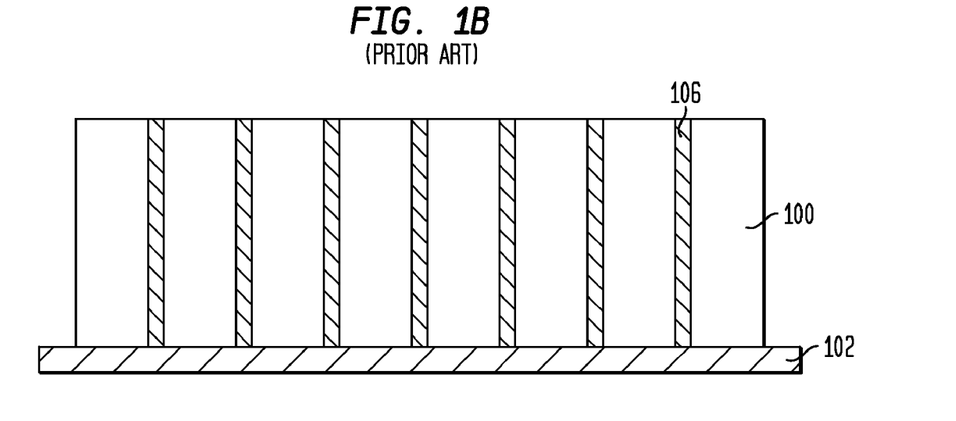
Figure 1C:
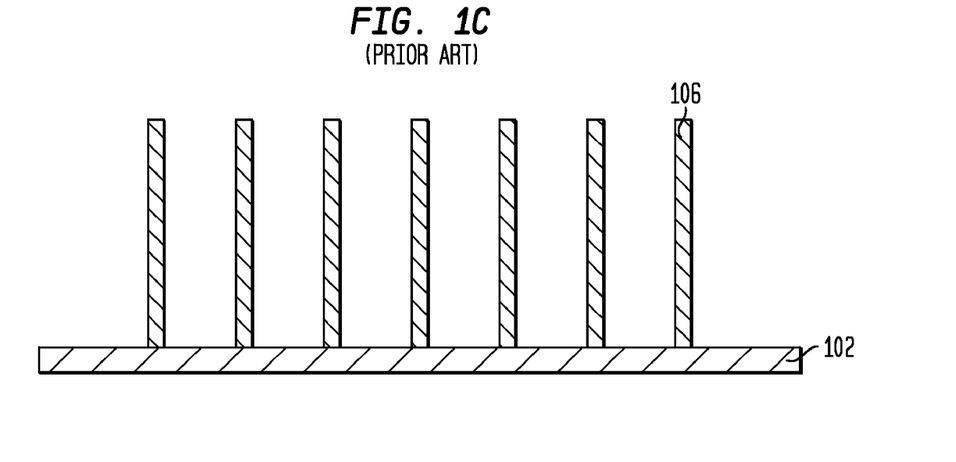
Figure 2:
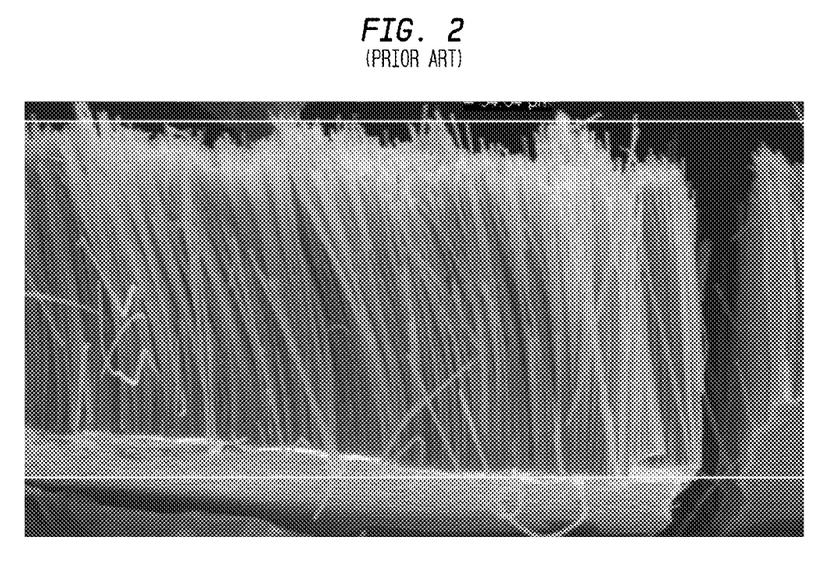
FIG. 2 is a pictorial view of multiple metal nanowires formed by the conventional bottom-up ECD process.

Metal nanowires have been conventionally formed by a bottom-up ECD or electroplating through mask process, as shown in FIGS. 1A-1C. Specifically, a substrate structure comprising a supporting matrix 100 with one or more open pores 104 and a conductive base layer 102 is first provided, as shown in FIG. 1A. Each of the open pores 104 extends through the supporting matrix 100 onto the conductive base layer 102. An ECD or electroplating process is then carried out to deposit a metal material 106 over the conductive base layer 102 and to fill the open pores 104, as shown in FIG. 1B. After the open pores 104 are completely filled with the metal material 106, the ECD process is terminated, followed by selective removal of the supporting matrix 100, thereby forming free-standing metal nanowires 106, as shown in FIG. 1C. FIG. 2 is a picture of multiple metal nanowires formed by such a conventional bottom-up ECD process.

The conventional bottom-up ECD process as described hereinabove has also been used for forming compositionally modulated structures that comprise alternating layers of ferromagnetic materials and nonmagnetic materials, such as Co/Cu, Co/Ru, Co/Au, Ni/Cu, NiCo/Cu, NiFe/Cu, CoFe/Cu, FeCoNi/Cu, etc. Such compositionally modulated ferromagnetic-nonmagnetic structures are particularly useful in giant magnetoresistance (GMR) applications, which require alternating layers of ferromagnetic and non-magnetic materials.

However, the conventional bottom-up electrodeposition of the above ferromagnetic/nonmagnetic layered structures relies on the large difference between the reversible potentials of the ferromagnetic/nonmagnetic materials. In most cases, the nonmagnetic elements, such as Cu and Au, are much more noble than the ferromagnetic elements, such as Fe, Ni and Co. In other words, the nonmagnetic elements are electrodeposited at a much less negative potential than the ferromagnetic elements. In addition, the nonmagnetic and ferromagnetic elements do not interact with each other during electrodeposition. Therefore, an electrolyte with a small amount of nonmagnetic elements and an excess amount of ferromagnetic elements is generally used to form the ferromagnetic/nonmagnetic layered structures. At a relatively low negative potential, pure elemental nonmagnetic material is electrochemically deposited, while the ferromagnetic elements are not deposited. At a relatively high negative potential, both the nonmagnetic and the ferromagnetic elements are electrochemically deposited. Due to the small amount of nonmagnetic species available in the solution, the ferromagnetic elements are deposited at a much faster rate than the nonmagnetic elements, thereby resulting in a deposited layer with ferromagnetic characteristics.

The conventional bottom-up ECD process has never been used for forming compositionally modulated structures that comprise alternative layers of different ferromagnetic materials, which have very close reversible potentials and which may interact with each other during electrodeposition.

SUMMARY OF THE INVENTION

U.S. Patent Application Publication No. 2008/0165576, which was filed on even date herewith and is assigned to the same assignee as the present application, describes a memory storage device comprising a plurality of alternating first and second ferromagnetic layers of different material compositions. The present invention correspondingly provides a method to form such a memory storage device using a pulsed ECD or electroplating process.

In one aspect, the present invention relates to a method comprising:
    forming a substrate structure comprising a supporting matrix having at least one open pore extending therethrough onto a conductive base layer; and
    electroplating the substrate structure by immersing the substrate structure in an electroplating solution that comprises at least one ferromagnetic metal element and one or more additional, different metal elements, either magnetic or nonmagnetic, and applying a pulsed electroplating potential with alternating pulses to the conductive base layer of the substrate structure to deposit a plurality of alternating ferromagnetic layers of different material compositions in the at least one open pore of the supporting matrix.

Preferably, the at least one open pore has a cross-sectional diameter ranging from about 10 nm to about 1000 nm.

In a preferred, but not necessary, embodiment of the present invention, the electroplating solution comprises a first ferromagnetic metal element and a second, different ferromagnetic metal element. Some of the resulting ferromagnetic layers may comprise the first (but not the second) ferromagnetic metal element, and others of the resulting ferromagnetic layers may comprise the second (but not the first) ferromagnetic metal element. Alternatively, all of the deposited ferromagnetic layers comprise the first and second ferromagnetic metal elements, but in different proportions.

In an alternative embodiment of the present invention, the electroplating solution comprises a ferromagnetic metal element and a non-ferromagnetic metal element. The resulting ferromagnetic layers are ferromagnetic and all comprise the ferromagnetic metal element and the non-ferromagnetic metal element, but in different proportions.

In still another alternative embodiment of the present invention, the electroplating solution comprises a ferromagnetic metal element, a first non-ferromagnetic metal element, and a second, different non-ferromagnetic metal element. Some of the resulting ferromagnetic layers comprise the ferromagnetic metal element alloyed with the first (but not the second) non-ferromagnetic metal element, and others of the resulting ferromagnetic layers comprise the ferromagnetic metal element alloyed with the second (but not the first) non-ferromagnetic metal element.

In still another alternative embodiment of the present invention, potential pulses with multiple high and/or low potential values can be applied, and the at least one open pore in the substrate matrix may be filled with alternating ferromagnetic layers of more than two different material compositions. The different material compositions may contain different ferromagnetic elements, different non-ferromagnetic elements, same ferromagnetic elements at different proportions, or same ferromagnetic and non-ferromagnetic elements at different proportions.

For a specific example, the electroplating solution comprises a Ni salt and a Fe salt, so that the resulting first and second ferromagnetic layers both comprise Ni—Fe alloys but with different proportions of Ni and Fe.

The supporting matrix as described hereinabove may comprise any suitable materials, e.g., photoresists, e-beam or x-ray dielectric resist materials, etc., which can be patterned to form open pores therein. Preferably, but not necessarily, the supporting matrix comprises a material selected from the group consisting of Si, $SiO_2$, $Si_3N_4$, Al, $Al_2O_3$, and mixtures thereof.

The conductive base layer may comprise any material that is conductive, such as metals, metal alloys, metal suicides, metal nitrides, doped semiconductors, etc. Preferably, but not necessarily, the conductive base layer comprises a material selected from the group consisting of Au, Cu, Pt, Pd, Ag, Si, GaAs, and alloys thereof.

The pulsed electroplating potential as described hereinabove may have high pulses ranging from about −1.0 V to about −1.8 V (as measured against a saturated calomel electrode or SCE) and low pulses ranging from −0.3 V to about −1.4 V (as measured against the SCE), provided that a high potential pulse always has a potential higher than those of the preceding and subsequent low potential pulses. Further, the pulsed electroplating potential can comprise high and/or low pulses of more than two potential values, so that the nanostructure formed comprises alternating ferromagnetic layers of more than two different material compositions. Further, the pulsed electroplating potential can comprise continuous changes, as discussed in more detail hereinafter, so that the nanostructure formed comprises continuous and gradual compositional changes.

The method of the present invention may further comprise the step of magnetizing the alternating ferromagnetic layers to form a plurality of alternating magnetic domains of opposite directions that are separated from each other by domain walls located therebetween. Such magnetic domains and domain walls are movable across the alternating ferromagnetic layers upon application of a driving current. In this manner, a magnetic storage device is formed, in which data can be stored as the magnetization of magnetic domains and the presence of domain walls.

In another aspect, the present invention relates to a nanostructure having a cross-sectional diameter ranging from about 10 nm to about 1000 nm and comprising a plurality of alternating ferromagnetic layers of different material compositions. For example, some of the ferromagnetic layers may comprise a first ferromagnetic metal element, and others of the second ferromagnetic layers may comprise a second, different ferromagnetic metal element. Alternatively, the alternating ferromagnetic layers may both comprise the first and second, different ferromagnetic metal elements, but in different proportions. Further, some of the ferromagnetic layers may comprise a ferromagnetic metal element alloyed with a first non-ferromagnetic metal element, and others of the ferromagnetic layers may comprise the same ferromagnetic metal element alloyed with a second, different non-ferromagnetic metal element. Still further, the alternating ferromagnetic layers may comprise the same ferromagnetic and non-ferromagnetic metal elements, but in different proportions.

In an exemplary, but not necessary embodiment of the present invention, the first and second ferromagnetic layers both comprise Ni—Fe alloys but with different proportions of Ni and Fe.

The nanostructure of the present invention may further comprise a plurality of alternating magnetic domains of opposite directions that are separated from each other by domain walls located therebetween. Such magnetic domains and domain walls are movable across the first and second ferromagnetic layers upon application of a driving current. Therefore, the nanostructure of the present invention can function as a magnetic storage device, in which data can be stored as the magnetization of magnetic domains and the presence of domain walls.

Other aspects, features and advantages of the invention will be more fully apparent from the ensuing disclosure and appended claims.

DETAILED DESCRIPTION OF THE INVENTION, AND PREFERRED EMBODIMENTS THEREOF

In the following description, numerous specific details are set forth, such as particular structures, components, materials, dimensions, processing steps and techniques, in order to provide a thorough understanding of the present invention. However, it will be appreciated by one ordinarily skilled in the art that the invention may be practiced without these specific details. In other instances, well-known structures or processing steps have not been described in detail in order to avoid obscuring the invention.

It will be understood that when an element as a layer, region or substrate is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The term "ferromagnetic material" as used herein refers to any material that can be magnetized by applying an external magnetic field and exhibit remnant magnetization after the external magnetic field is removed.

The term "ferromagnetic layer" or "ferromagnetic layers" as used herein refers to one or more layered structures that exhibit spontaneous magnetization overall. The ferromagnetic layer or layers of the present invention comprise(s) at least one ferromagnetic element, with or without additional ferromagnetic or non-ferromagnetic elements.

The present invention provides compositionally modulated ferromagnetic nanostructures that each has a cross-sectional diameter ranging from about 10 nm to about 1000 nm and comprises alternating ferromagnetic layers of different material properties. The present invention is also broadly applicable to film structures comprising alternating ferromagnetic layers of different material properties.

Such ferromagnetic nanostructures can be magnetized to form a plurality of alternating magnetic domains of opposite directions with domain walls located therebetween. The magnetic domains and domain walls are movable across the ferromagnetic layers, and the alternating ferromagnetic layers of different material properties are particularly effective in pinning the domain walls and ensuring movement of the domain walls at very discrete and precise increments or steps, without any drifting. In this manner, the ferromagnetic nanostructures can be used as memory storage devices, in which data is stored as locations of the magnetic domains and domain walls. For more information about such memory storage devices, please see the U.S. Patent Application Publication No. 2008/0165576.

Figure 3:
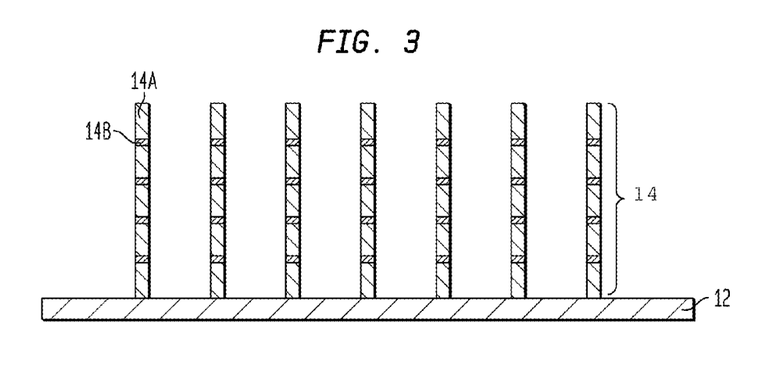
FIG. 3 is a cross-sectional view of compositionally modulated nanostructures comprising alternating first and second ferromagnetic layers of different material compositions, according to one embodiment of the present invention.

Specifically, FIG. 3 shows a cross-sectional view of multiple ferromagnetic nanowires 14 located on conductive base layer 12, each of which has a cross-sectional diameter ranging from about 10 nm to about 1000 nm and contains alternating first and second ferromagnetic layers 14A and 14B of different material compositions.

In an exemplary, but not necessary embodiment, of the present invention, each of the first ferromagnetic layers 14A contains a first ferromagnetic material A, and each of the second ferromagnetic layers 14B contains a second, different ferromagnetic material B. In an alternative embodiment of the present invention, the first and second ferromagnetic layers 14A and 14B both comprise the first ferromagnetic material A and the second, different ferromagnetic material B, but in different proportions. In another alternative embodiment of the present invention, each the first ferromagnetic layers 14A contains a ferromagnetic material A mixed with a first non-ferromagnetic material C, and each of the second ferromagnetic layers 14A contains a ferromagnetic material A mixed with a second, different non-ferromagnetic material D, provided that such non-ferromagnetic materials C and D do not affect the overall ferromagnetic characteristic of layers 14A and 14B. In still another embodiment of the present invention, the first and second ferromagnetic layers 14A and 14B both comprise a ferromagnetic material A mixed with a non-ferromagnetic material C, but in different proportions, provided that such non-ferromagnetic material C does not affect the overall ferromagnetic characteristic of layers 14A and 14B.

The ferromagnetic materials A and B as disclosed hereinabove may comprise any suitable ferromagnetic element(s). For example, the ferromagnetic materials A and B may comprise one or more ferromagnetic elements, including, but not limited to: Fe, Ni, Co, Gd, Dy, Th, Ho, Er, and mixtures or combinations thereof. Such ferromagnetic materials A and B can present either in pure form, or as mixtures with other ferromagnetic or non-ferromagnetic elements.

The non-ferromagnetic materials C and D as disclosed hereinabove may comprise any non-ferromagetic element(s) or mixtures thereof, including, but not limited to: Ru, Mo, Mn, Cr, Si, Ge, Ga, As, Cu, Rh, Pt, Au, Pd, etc.

The ferromagnetic nanowires of FIG. 3 can be magnetized in small sections to form alternating magnetic domains of opposite directions and domain walls located therebetween. The magnetic domains and domain walls can be moved upon the application of a driving current. In this manner, the ferromagnetic nanowires function as memory storage devices, in which digital data is stored as the magnetization of each magnetic domain in each segment, 14A, and the domain walls between adjacent magnetic domains can be pinned in the segments, 14B. Information can then be read from or be written to such a memory storage device by a reading or a writing device when the magnetic domains are moved across such a reading or writing device upon application of a driving current.

It is important to note that although the ferromagnetic nanostructures of the present invention may have any regular or irregular cross-sectional shape, such as circular, square, rectangular, triangular, polygonal, semi-circular, ellipsoidal, etc. Further, the ferromagnetic nanostructures of the present invention may be either solid nanorods with relatively homogeneous interior and exterior compositions, or tubular nanostructures with insulating or highly resistive semiconductor cores that are non-magnetic.

Although the ferromagnetic nanostructures as shown in FIG. 3 comprise only two different ferromagnetic layers, it is understood that the ferromagnetic nanostructures of the present invention can comprise more than two different layers, i.e., additional layers of different material compositions can be provided between the alternating first and second ferromagnetic layers 14A and 14B, and such additional layers can be either ferromagnetic or non-ferromagnetic.

The ferromagnetic nanowires as described hereinabove can be formed by a pulsed ECD process. Specifically, a substrate containing a supporting matrix with at least one open pore and a conductive base layer 12 is first formed. The supporting matrix may comprise any suitable material, including, but not limited to: Si, $SiO_2$, $Si_3N_4$, Al, $Al_2O_3$, and mixtures thereof. Therefore, the open pore preferably has a cross-sectional diameter from about 10 nm to about 1000 nm. Further, the open pore preferably extends through the supporting matrix onto the conductive base layer, so that the conductive base layer can be used as a seed layer for subsequent electroplating. The shape of the open pore determines the shape of the ferromagnetic nanowires to be formed. The conductive base layer may comprise any suitable conductive material for electroplating, which includes, but is not limited to: Au, Cu, Pt, Ag, Si, GaAs, and alloys thereof.

For example, anodized $Al_2O_3$ film or commercially available Whatman® membrane (manufactured by Whatman, Inc. at Florham Park, N.J.), which contains a supporting matrix of aluminum oxide with open pores therein, can be used for forming the substrate of the present application by sputtering a metal on one side of the membrane to form the conductive base layer.

Electroplating of the above-described substrate structure is then carried out in an electroplating solution under a pulsed electroplating potential, so as to form alternating ferromagnetic layers of different material compositions. Subsequently, the supporting matrix is selectively removed to form the desired ferromagnetic nanostructures.

The electroplating solution as used herein comprises one or more salts of ferromagnetic metal species and one or more supporting electrolyte salts. The electroplating solution may further comprise one or more components, such as pH buffering agents, complexing agents, surfactants, organic additives (e.g., brighteners or suppressants), etc., for enhancing the material quality of the deposited layers.

For example, the electroplating solution may comprise a first salt of a first ferromagnetic metal element and at least one additional salt of a second, different ferromagnetic metal element, which can be used to form alternating ferromagnetic layers that comprise different ferromagnetic metal elements, or ferromagnetic layers that comprise the same ferromagnetic metal elements but in different proportions. Alternatively, the electroplating solution may comprise a salt of a ferromagnetic metal element and at least one additional salt of a non-ferromagnetic metal element, which can be used to form alternating ferromagnetic layers that comprise both the ferromagnetic metal element and the non-ferromagnetic metal element but in different proportions. Further, the electroplating solution may comprise a salt of a ferromagnetic metal element, a first additional salt of a first non-ferromagnetic metal element, and a second additional salt of a second, different non-ferromagnetic metal element, which can be used to form alternating ferromagnetic layers that comprise the same ferromagnetic metal element mixed with different non-ferromagnetic metal elements.

An exemplary electroplating solution comprises about 0.05-0.5 mol/L nickel sulfate, 0.1-1 mol/L nickel chloride, 0.005-0.2 mol/L ferrous sulfate, 0.1-0.5 mol/L boric acid, 0.1-1 mol/L sodium chloride, and 0.1-2 g/L sodium saccharin, and 0.05-0.1 g/L sodium lauryl sulfate, which can be used to form alternating ferromagnetic layers that comprise Ni—Fe alloys with different Ni and Fe contents.

Figure 4:
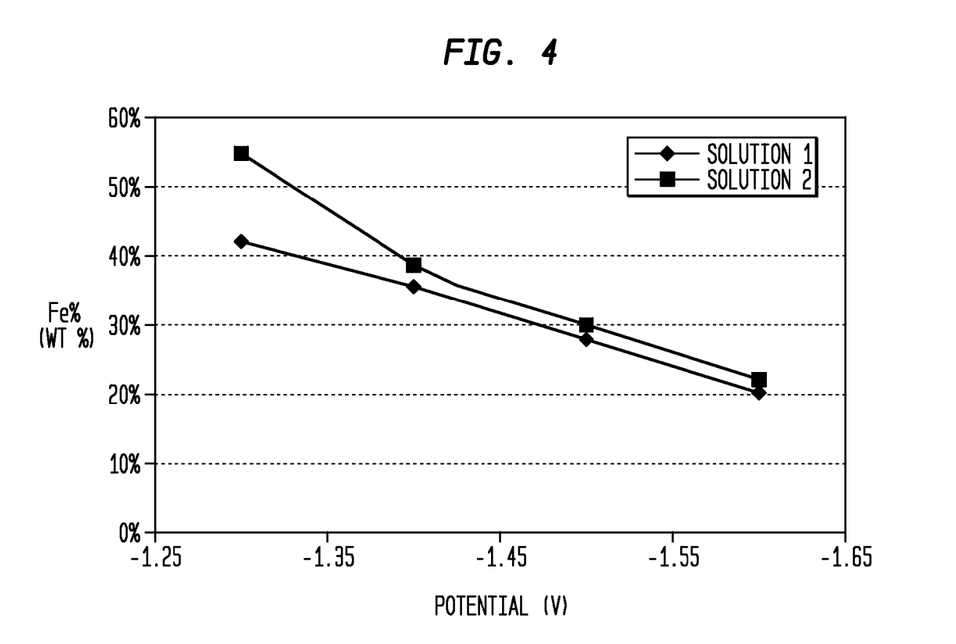
FIG. 4 is a graph that plots the Fe contents of Ni—Fe alloys as deposited from two different Ni—Fe electroplating solutions as a function of the applied electroplating potentials.

The same electroplating solution can be used for depositing metal layers of different material compositions when different electroplating potentials are applied. FIG. 4 shows the change of Fe contents in electroplated Ni—Fe alloys in response to the change of electroplating potentials. Specifically, under a relatively low electroplating potential of about $-1.3V$ (as measured against the SCE), the Fe content in the Ni—Fe alloys electroplated from solutions 1 and 2 ranges from about 40% to about 55%. However, under a relatively high electroplating potential of about $-1.6V$ (as measured against the SCE), the Fe content reduces to about 20%.

Therefore, by applying a pulsed electroplating potential with alternating high and low pulses to the conductive base layer of the substrate structure as described hereinabove, alternating ferromagnetic layers with different material compositions can be formed using the same electroplating solution in a continuous electroplating process. The thicknesses of the alternating ferromagnetic layers can be precisely controlled by duration of each potential pulse.

Figure 5:
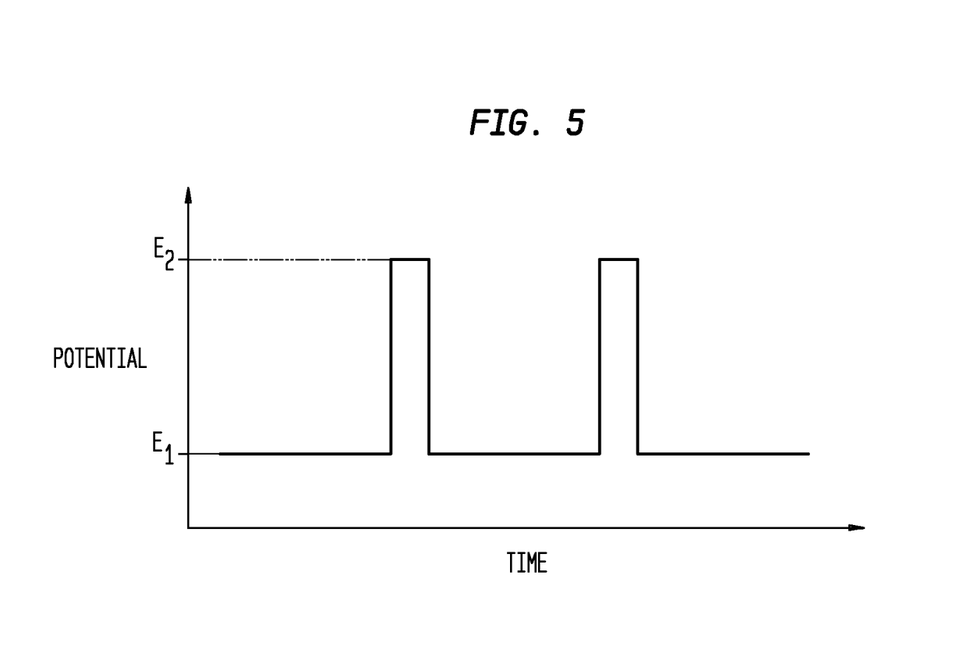
FIG. 5 shows the potential profile of a pulsed electroplating potential that comprises abruptly alternating high and low pulses, according to one embodiment of the present invention.

FIG. 5 shows the potential profile for an exemplary pulsed electroplating potential that can be used in the present invention. Specifically, the pulsed electroplating potential comprises low pulses of potential value E1 and high pulses of potential value E2, while the high and low pulses abruptly alternate from one to the other over time. Preferably, but not necessarily, the high pulses have potential values ranging from about $-1.0$ V to about $-1.8$ V (as measured against the SCE), and the low pulses have potential values ranging from about $-0.3$ V to about $-1.4$ V (as measured against the SCE).

Figure 6A:
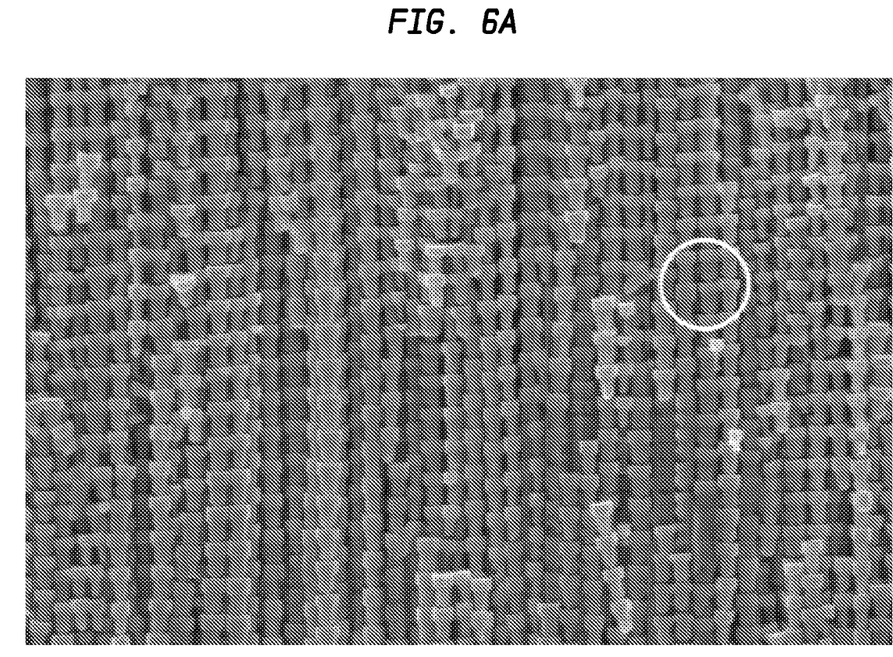
FIGS. 6A and 6B show scanning electron microscopy (SEM) pictures of ferromagnetic nanowires that contain alternating layers of $Ni_{45}Fe_{55}$ and $Ni_{80}Fe_{20}$ alloys, as electroplated using a pulsed potential with a potential profile similar to that shown in FIG. 5, according to one embodiment of the present invention. The wires are shown after being etched in an acid solution to selectively remove the $Ni_{45}Fe_{55}$ alloy. The thicker sections of the wire contain the $Ni_{80}Fe_{20}$ alloy, and the thinner sections of the wire contain the $Ni_{45}Fe_{55}$ alloy.
Figure 6B:
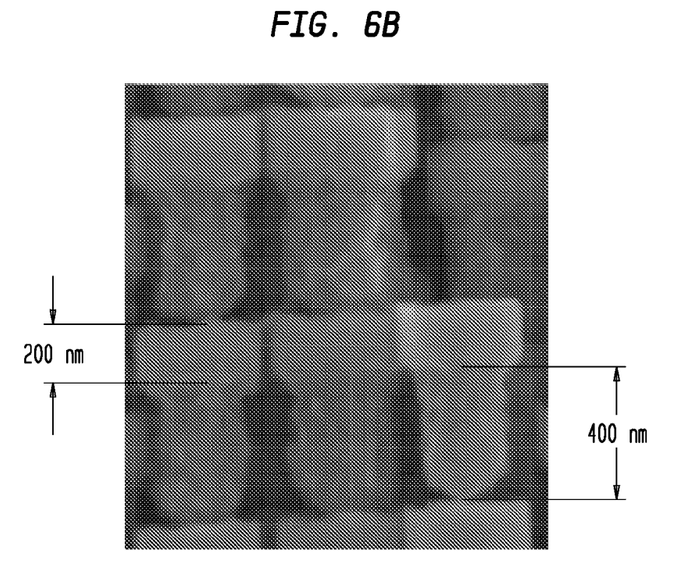

FIG. 6A shows a SEM picture of ferromagnetic nanowires that contain alternating layers of $Ni_{45}Fe_{55}$ and $Ni_{80}Fe_{20}$, as electroplated from the exemplary electroplating solution as described hereinabove using a pulsed electroplating potential with a potential profile similar to that shown in FIG. 5. Specifically, the high pulses have a potential value of about $-1.6V$, and the low pulses have a potential value of $-1.3V$, with respect to a saturated calomel reference electrode. The $Al_2O_3$ matrix was dissolved in a NaOH solution, and the wires were etched in a $HNO_3$ ethanol solution before imaging. Typically, the higher Fe content in the NiFe alloy, the faster the NiFe alloy is dissolved in the $HNO_3$ ethanol solution. Therefore, the segments containing the $Ni_{45}Fe_{55}$ alloy are much thinner than the segments containing the $Ni_{80}Fe_{20}$ alloy, due to the selective etching of the $Ni_{45}Fe_{55}$ alloy over the $Ni_{80}Fe_{20}$ alloy. Consequently, the compositional modulation can be readily observed. FIG. 6B is an enlarged picture of the region circled by white in FIG. 6A. The $Ni_{45}Fe_{55}$ layers as shown in FIG. 6B have a layer thickness of about 400 nm, and the $Ni_{80}Fe_{20}$ layers have a layer thickness of about 200 nm.

Figure 7:
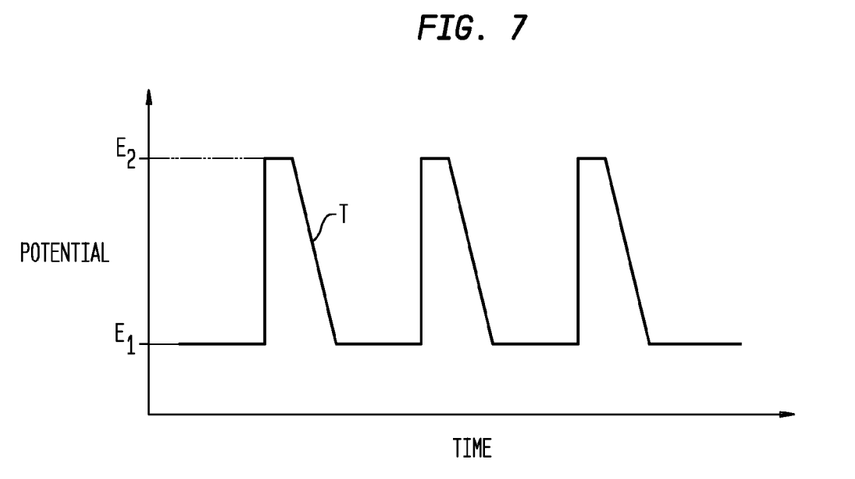
FIG. 7 shows the potential profile of a pulsed electroplating potential that comprises alternating high and low pulses with a ramping period therebetween, according to one embodiment of the present invention.
Figure 8:
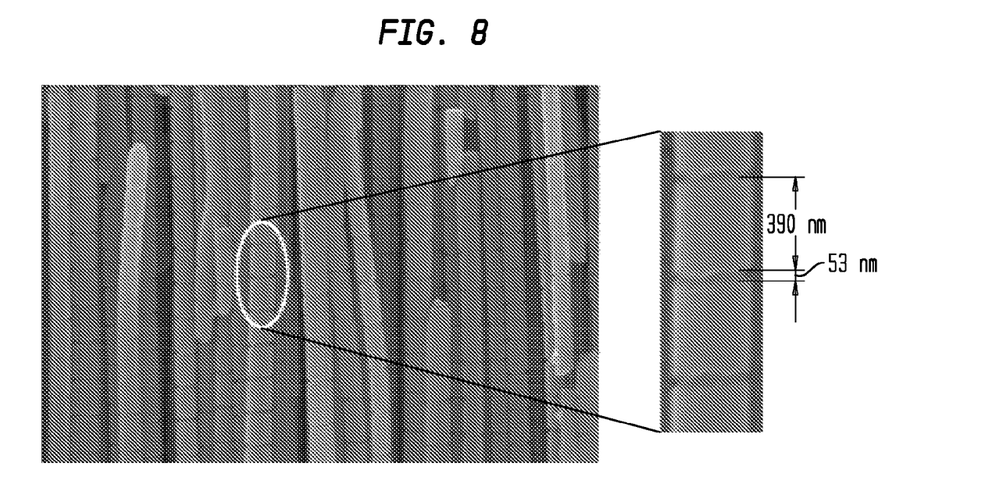
FIG. 8 shows SEM pictures of ferromagnetic nanowires that contain alternating layers of $Ni_{45}Fe_{55}$ and $Ni_{80}Fe_{20}$ alloys, as electroplated using a pulsed potential with a potential profile similar to that shown in FIG. 7, according to one embodiment of the present invention. The wires are shown after being etched in an acid solution to selectively remove the $Ni_{45}Fe_{55}$ alloy. The thicker sections of the wire contain the $Ni_{80}Fe_{20}$ alloy, and the notched sections of the wire contain the $Ni_{45}Fe_{55}$ alloy.
Figure 9A:
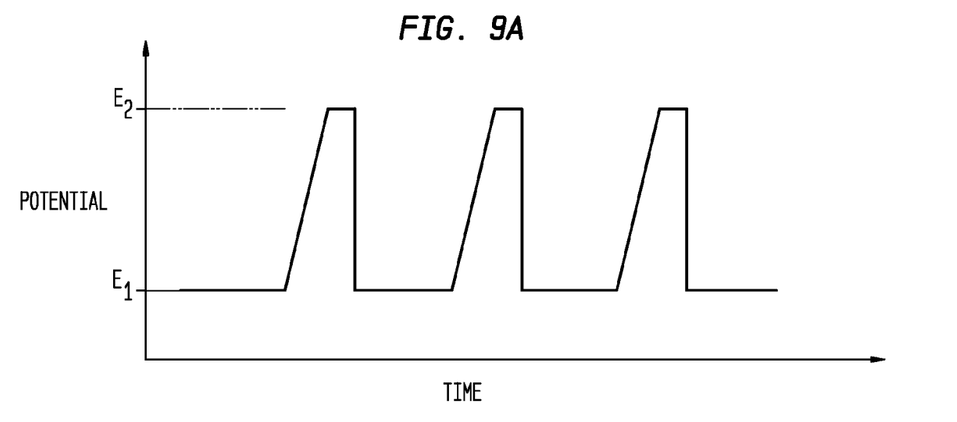
FIGS. 9A-9H show various exemplary pulsed electroplating potentials of different potential profiles.
Figure 9B:
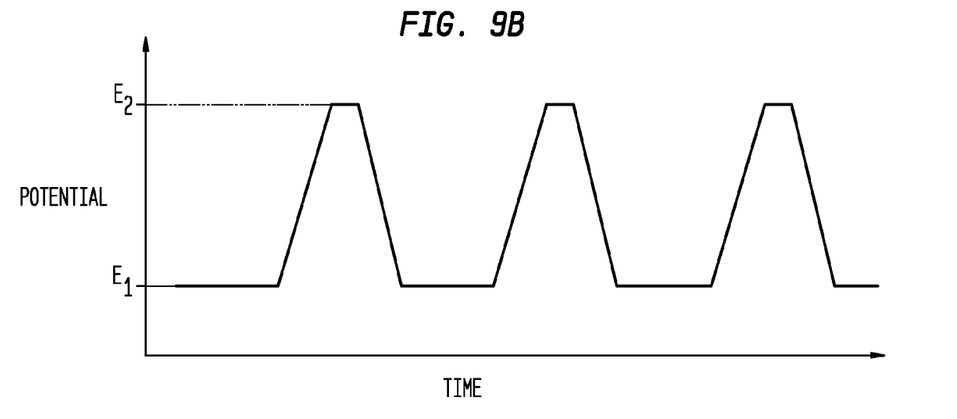
Figure 9C:
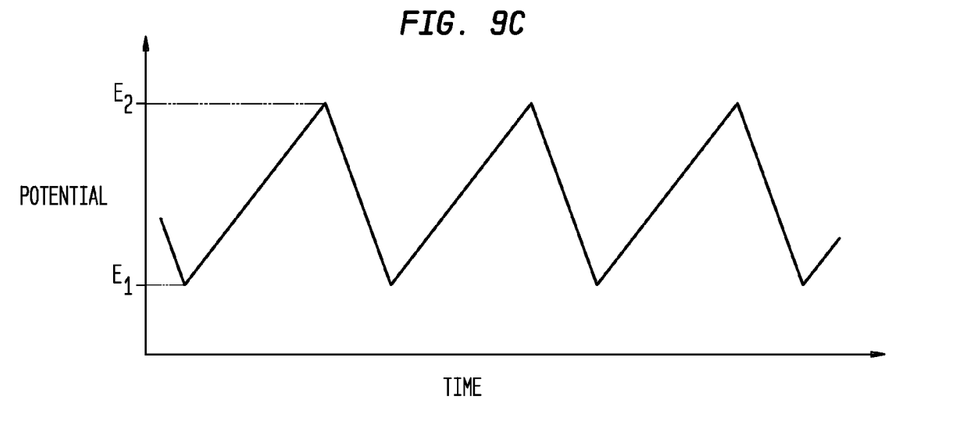
Figure 9D:
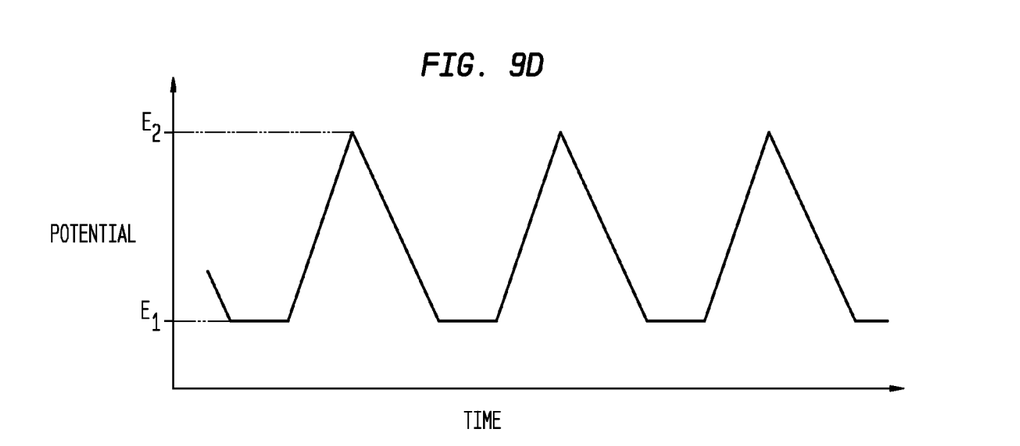
Figure 9E:
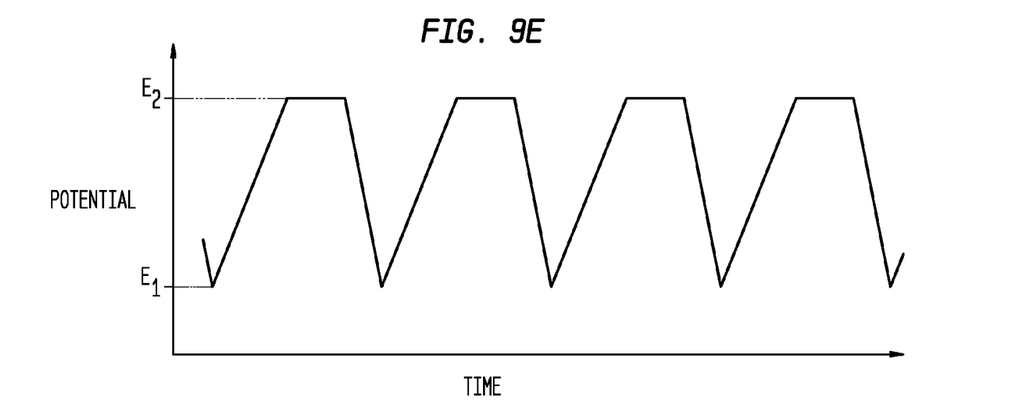
Figure 9F:
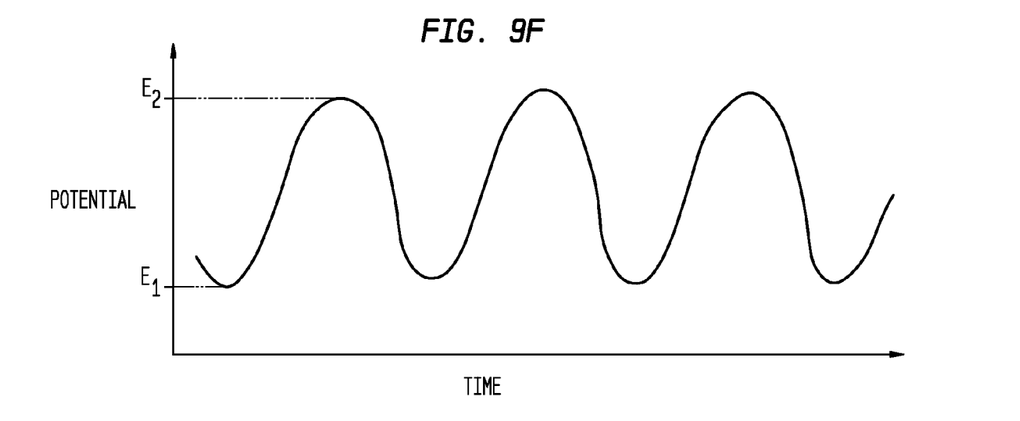
Figure 9G:
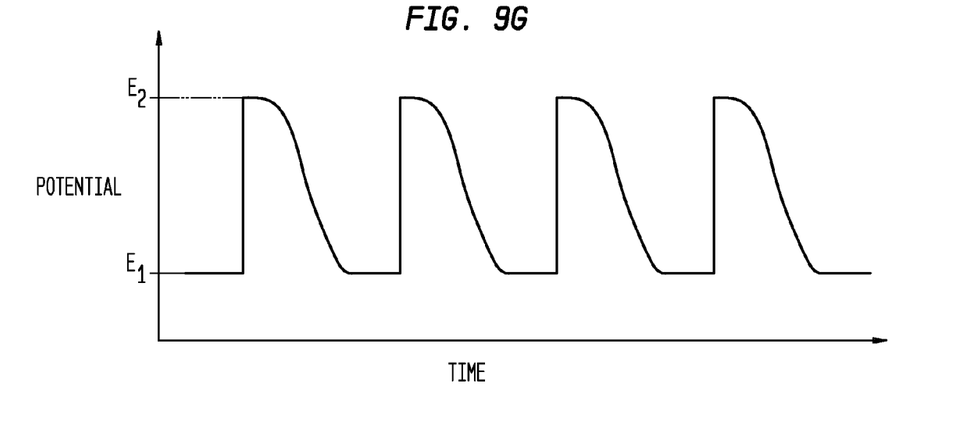
Figure 9H:
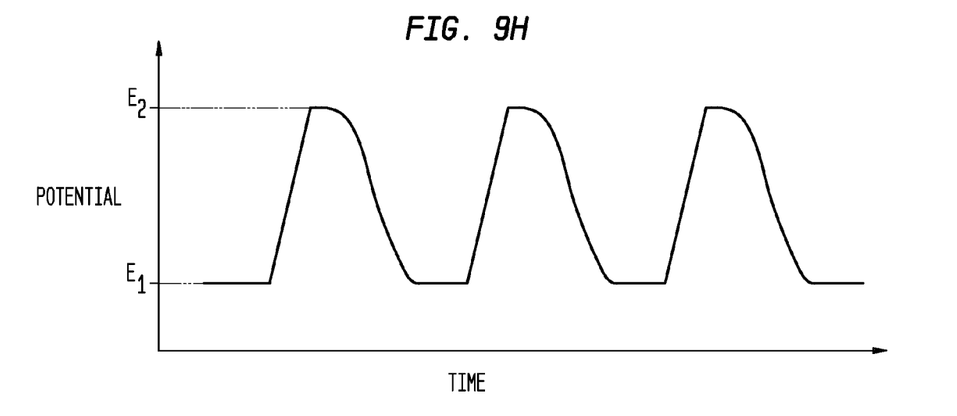

FIG. 7 shows the potential profile for another exemplary pulsed electroplating potential that can be used in the present invention. Specifically, the pulsed electroplating potential comprises alternating low pulses of potential value E1 and high pulses of potential value E2, while a ramping period (T) is provided between E1 and E2. The composition of the electroplated layers can be more continuously and gradually controlled with such a ramping period. FIG. 8 shows the SEM pictures of ferromagnetic nanowires that contain alternating layers of $Ni_{45}Fe_{55}$ and $Ni_{80}Fe_{20}$, as electroplated using a pulsed electroplating potential with a potential profile similar to that shown in FIG. 7.

The pulsed electroplating potential may have any suitable potential profile, as long as such potential profile contains alternating high and low pulses. For example, additional potential profiles as shown in FIGS. 9A-9H can also be used for forming the ferromagnetic nanostructures of the present invention. Further, the pulsed electroplating current can comprise high pulses of different potential values or low pulses of different potential values or both, so that the nanostructure so formed comprises additional layers of different material compositions between the first and second ferromagnetic layers.

It is important to note that the present invention broadly covers any ferromagnetic nanostructure with alternating ferromagnetic layers of different material compositions. The number of alternating ferromagnetic layers may range from two to hundreds. Further, each ferromagnetic layer may comprise any ferromagnetic elements mixed with any number of additional ferromagnetic or non-ferromagnetic elements, as long as the overall characteristic of such a layer remains ferromagnetic.

The ferromagnetic nanostructures of the present invention can be used for forming memory storage elements, as described hereinabove, or any other spinstronic devices that require alternating ferromagnetic layers of different material compositions.

While the invention has been described herein with reference to specific embodiments, features and aspects, it will be recognized that the invention is not thus limited, but rather extends in utility to other modifications, variations, applications, and embodiments, and accordingly all such other modifications, variations, applications, and embodiments are to be regarded as being within the spirit and scope of the present invention.

What is claimed is:

1. A nanostructure comprising a plurality of alternating ferromagnetic layers of different material compositions directly contacting a conductive base layer, wherein each of said plurality of alternating ferromagnetic layers of different composition has a cross-sectional diameter ranging from about 10 nm to about 1000 nm, and wherein each of said plurality of alternating ferromagnetic layers abuts at least another of said plurality of alternating ferromagnetic layers having a different material composition.

2. The nanostructure of claim 1, wherein some of the ferromagnetic layers comprise a first ferromagnetic metal element, and wherein others of the ferromagnetic layers comprise a second, different ferromagnetic metal element.

3. The nanostructure of claim 1, wherein all of the ferromagnetic layers comprise a first ferromagnetic metal element and a second, different ferromagnetic metal element, but in different proportions.

4. The nanostructure of claim 1, wherein all of the ferromagnetic layers comprise a ferromagnetic metal element and a non-ferromagnetic metal element, but in different proportions.

5. The nanostructure of claim 1, wherein some of the ferromagnetic layers comprise a ferromagnetic metal element alloyed with a first non-ferromagnetic metal element, and wherein others of the ferromagnetic layers comprise the ferromagnetic metal element alloyed with a second, different non-ferromagnetic metal element.

6. The nanostructure of claim 1, wherein the plurality of alternating ferromagnetic layers comprise first and second ferromagnetic layers both comprising Ni—Fe alloys with different proportions of Ni and Fe.

7. The nanostructure of claim 1, comprising alternating ferromagnetic layers of more than two different material compositions.

8. The nanostructure of claim 1, further comprising a plurality of alternating magnetic domains of opposite directions that are separated from each other by domain walls located therebetween, and wherein said magnetic domains and domain walls are movable across the alternating ferromagnetic layers upon application of a driving current to said nanostructure.

* * * * *